United States Patent [19]
Washington et al.

[11] Patent Number: 5,835,775
[45] Date of Patent: Nov. 10, 1998

[54] METHOD AND APPARATUS FOR EXECUTING A FAMILY GENERIC PROCESSOR SPECIFIC APPLICATION

[75] Inventors: Peter Washington, Little Mountain; Richard R. Barton, Lexington, both of S.C.

[73] Assignee: NCR Corporation, Dayton, Ohio

[21] Appl. No.: 764,146

[22] Filed: Dec. 12, 1996

[51] Int. Cl.⁶ .................................................. G06F 9/44
[52] U.S. Cl. ........................................... 395/706; 395/712
[58] Field of Search .................................... 395/701, 705, 395/706, 712, 860, 670

[56] References Cited

U.S. PATENT DOCUMENTS

| | | | |
|---|---|---|---|
| 5,247,520 | 9/1993 | Geise et al. | 370/469 |
| 5,432,937 | 7/1995 | Tevanian et al. | 395/712 |
| 5,499,379 | 3/1996 | Tanaka et al. | 395/860 |
| 5,604,905 | 2/1997 | Tevanian et al. | 395/706 |

*Primary Examiner*—Majid A. Banankhan
*Attorney, Agent, or Firm*—Paul J. Maginot

[57] ABSTRACT

A method and computer system are disclosed for executing family generic, processor specific files. In accordance with one embodiment of the present invention, there is provided a method of executing a file on a computer system. The method includes the computer implemented steps of determining the processor type of a processor; storing a processor type identifier that represents the determined processor type of the processor; executing a first plurality of instructions that includes instructions exclusively from a common set of instructions that are common to a plurality of processor types; executing a second plurality of instructions that is optimized for a first processor type, if the processor type identifier indicates that the processor is of the first processor type; and executing a third plurality of instructions that includes instructions exclusively from the common set of instructions, if the processor type identifier indicates the processor is of a type different than the first processor type.

19 Claims, 6 Drawing Sheets

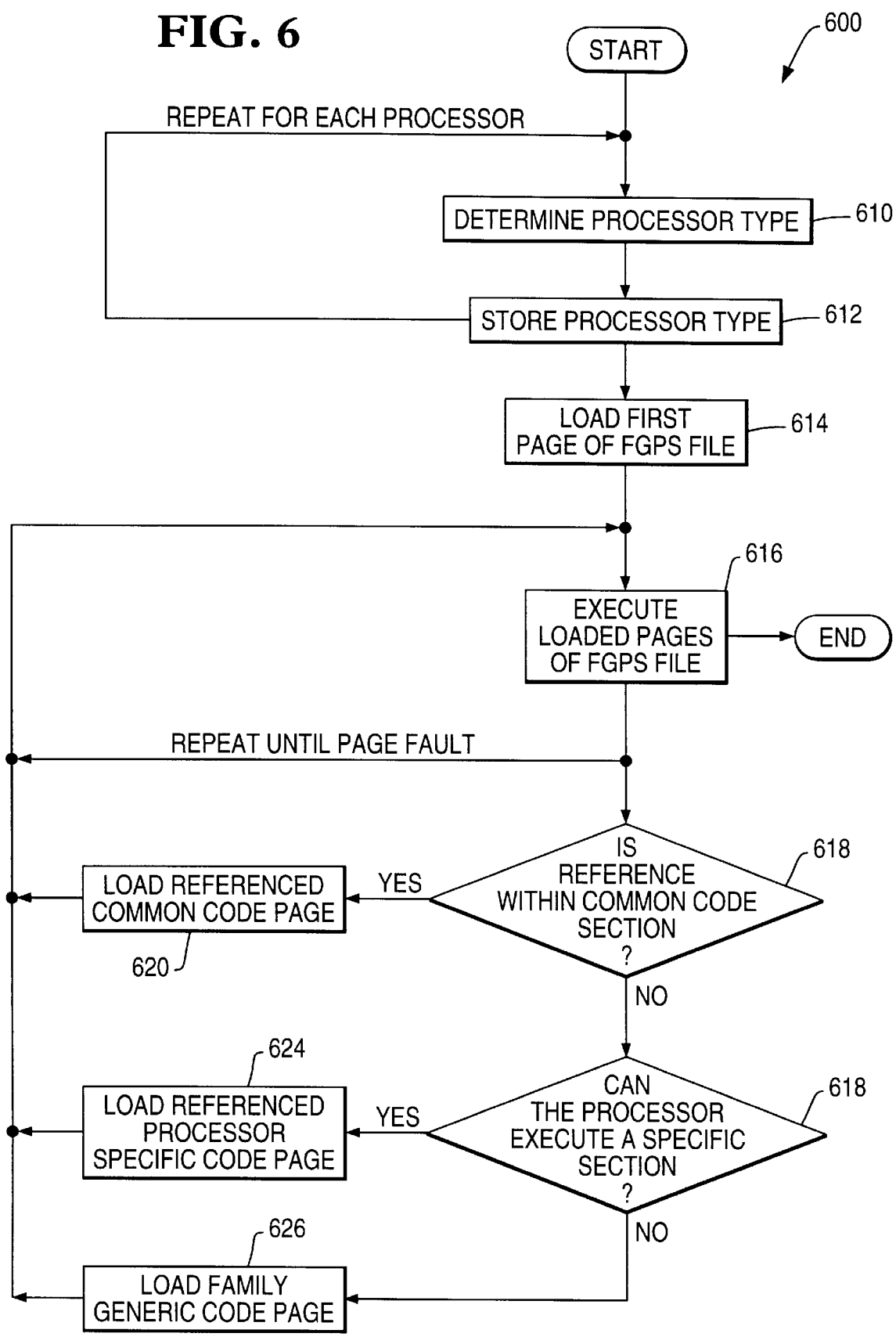

METHOD AND APPARATUS FOR EXECUTING A FAMILY GENERIC PROCESSOR SPECIFIC APPLICATION

BACKGROUND OF THE INVENTION

The present invention relates generally to the field of generating files for and executing files on computer systems, and more particularly to a method and an apparatus for executing a family generic, processor specific file.

Intel, Motorola, IBM, DEC and various other processor manufacturers produce processor families in which each processor supports a common subset of binary instructions (e.g. Intel's x86 family and Motorola's 68k family). However, later generation processors of the processor family typically contain a superset of binary instructions which are not supported by all processors of the processor family. This superset of binary instructions provides the later generation processors with increased functionality that would result in increased computer system performance if the binary instructions were utilized in executable files.

Furthermore, these later generation processors may also be architecturally different from earlier processors of the processor family. These architectural differences may result in a binary instruction or an ordering of binary instructions having a different performance penalty on one processor than another processor of the same processor family. As a result of these different performance penalties, one processor may have one optimized sequence of binary instructions for a task, and another processor of the family may have another optimized sequence of binary instructions for the same task even though both optimized sequences include only instructions from the common subset of instructions.

One known approach for taking advantage of the increased functionality of later generation processors has been to generate separate executable files for each different processor of the family. This approach results in very efficient executable files for single processor systems and multiprocessor systems having identical processors. However, this approach also requires maintaining separate executable files for each processor in the processor family.

Furthermore, this approach also requires that hybrid multiprocessor computer systems (i.e. computer systems having various processors of a processor family) maintain a separate executable file for each different processor in the computer system. Therefore, in a hybrid multiprocessor computer system, this approach results in wasted mass storage space and memory space because multiple executable files must be stored on the mass storage device and in main memory of the computer system.

Another disadvantage of this approach occurs when executable files are distributed from a network server to computer systems of the network having various processors of a processor family. For example, if the network includes computer systems having 286, 386, 486, or Pentium processors, then multiple versions of the executable file may be needed in order to obtain optimal performance from each of these systems. In addition, each computer system must be configured to select the appropriate version of the executable file from the network server.

What is needed therefore is a executable file that is optimized for a specific processor but executable by a family of processors.

SUMMARY OF THE INVENTION

In accordance with one embodiment of the present invention, there is provided a method of executing a file on a computer system. The method includes the computer implemented steps of determining the processor type of a processor; storing a processor type identifier that represents the determined processor type of the processor; executing a first plurality of instructions that includes instructions exclusively from a common set of instructions that are common to a plurality of processor types; executing a second plurality of instructions that is optimized for a first processor type, if the processor type identifier indicates that the processor is of the first processor type; and executing a third plurality of instructions that includes instructions exclusively from the common set of instructions, if the processor type identifier indicates the processor is of a type different than the first processor type.

In accordance with another embodiment of the present invention, there is provided a method of executing a file on a computer system. The method includes the computer implemented steps of determining the processor type of a first processor; storing a first processor type identifier that represents the determined processor type of the first processor; allocating execution of the file to the first processor; loading a first page of instructions from a common code section of the file into a shared memory area; executing the first page of instructions until a reference to a second page of the file is made; determining which page of the file to load in order to satisfy the reference; loading the determined second page of instructions to the shared memory area if the second page is from the common code section of the file; loading the determined second page of instructions to the shared memory area if the second page is from the family generic section of the file; loading the determined second page of instructions to a first processor memory area if the second page is from the processor specific section of the file. The common code section includes a plurality of pages consisting of instructions from a common set of instructions that is common to the processor type of the first processor and second processor type. The processor specific section includes a plurality of pages that have been optimized for a certain processor type. The family generic section includes a plurality of pages consisting of instructions from a common set of instructions that is common to the processor type of the first processor and a second processor type.

In accordance with yet another embodiment of the present invention, there is provided a computer system. The computer system includes a first processor of a first processor type, a second processor of a second processor type, a computer readable medium, and a memory coupled to the first processor, the second processor, and the computer readable medium. The computer readable medium has stored thereon a file including a common code section, a processor specific section, and a family generic section. The common code section includes a plurality of pages consisting of instructions from a common set of instructions that is common to the first processor type and the second processor type. The processor specific section includes a plurality of pages that have been optimized for the first processor type. The family generic section includes a plurality of pages consisting of instructions from the common set of instructions. The memory includes a first processor memory area, a second processor memory area, and a shared memory area. The memory has stored therein sequences of instructions which, when executed by the first processor and the second processor, cause the first processor and the second processor to perform the steps of determining the processor type of the first processor; storing a first processor type identifier that represents the determined processor type of the first processor in the first processor memory; allocating execution of the file to the first processor; loading a first page of instructions from the common code section of the file into the shared memory area; executing the first page of instructions until a reference to a second page of the file is made; determining which page of the file to load in order to satisfy the reference; loading the determined second page of instructions to the shared memory area if the second page is from the common code section of the file; loading the determined second page of instructions to the shared memory area if the second page is from the family generic section of the file; and loading the determined second page of instructions to a first processor memory area if the second page is from the processor specific section of the file.

It is an object of the present invention to provide a new and useful method for generating an executable.

It is yet another object of the present invention to provide a method for generating a single program executable that is optimized for execution on at least two different processors.

It is yet a further object of the present invention to provide a method for generating a single program executable for a computer system having two processors with different instruction sets.

Another object of this invention is to permit a computer system to execute system software which is based on a plurality of processors.

Another object of this invention is to allow a plurality of processors to operate interactively and each processor will execute its own version of the compiled instructions.

The above and other objects, features, and advantages of the present invention will become apparent from the following description and the attached drawings.

BRIEF DESCRIPTION OF THE DRAWINGS

FIG. 6 is a flowchart illustrating the execution of the second embodiment of the FGPS file.

DETAILED DESCRIPTION OF THE PREFERRED EMBODIMENT

Figure 1:
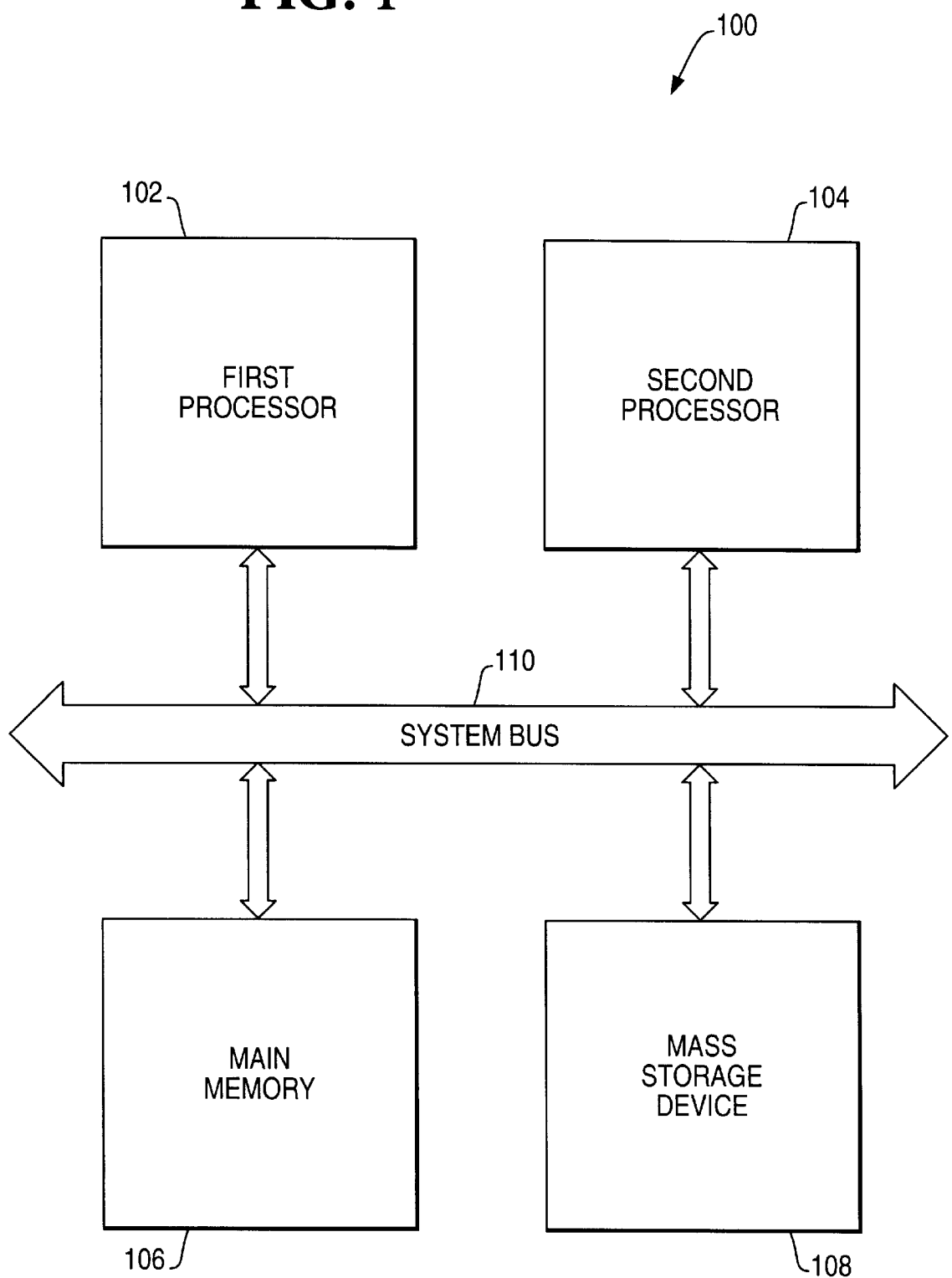
FIG. 1 is a block diagram of an exemplary hybrid multiprocessor system.

While the invention is susceptible to various modifications and alternative forms, a two specific embodiments thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring to FIG. 1 a hybrid multiprocessor computer system 100 for implementing the present invention is illustrated. What is meant by a "hybrid" multiprocessor computer system is a computer system that includes a processor that is a different type from another processor of the computer system. The hybrid multiprocessor computer system 100 includes a first processor 102, a second processor 104, main memory 106, and a mass storage device 108, each operatively coupled together by system bus 110.

The first processor 102 and the second processor 104 may be any known processor. However, to be a hybrid computer system the first processor 102 must be a different processor type than the second processor 104 and to take advantage of certain features of the present invention, the instruction sets of the first processor 102 and the second processor 104 must share a common subset of instructions. For example, the first processor 102 may be an Intel 486 processor and the second processor 104 may be an Intel Pentium processor.

Main memory 106 is comprised of dynamic random access memory (DRAM) and in this embodiment comprises 64 megabytes of memory. The mass storage device 108 may utilize both fixed and removable media, such as magnetic, optical or magnetic optical storage systems or any other available mass storage technology. Furthermore, the system bus 110 may be implemented in any known bus architecture such as ISA, EISA, PCI, etc.

The computer system described above is for purposes of example only. The present invention may be implement on any type of computer system or processing environment and is not limited to the computer system described above. For example, the present invention may be implemented on a single processor computer system or on a non-hybrid multiprocessor computer system.

Figure 2:
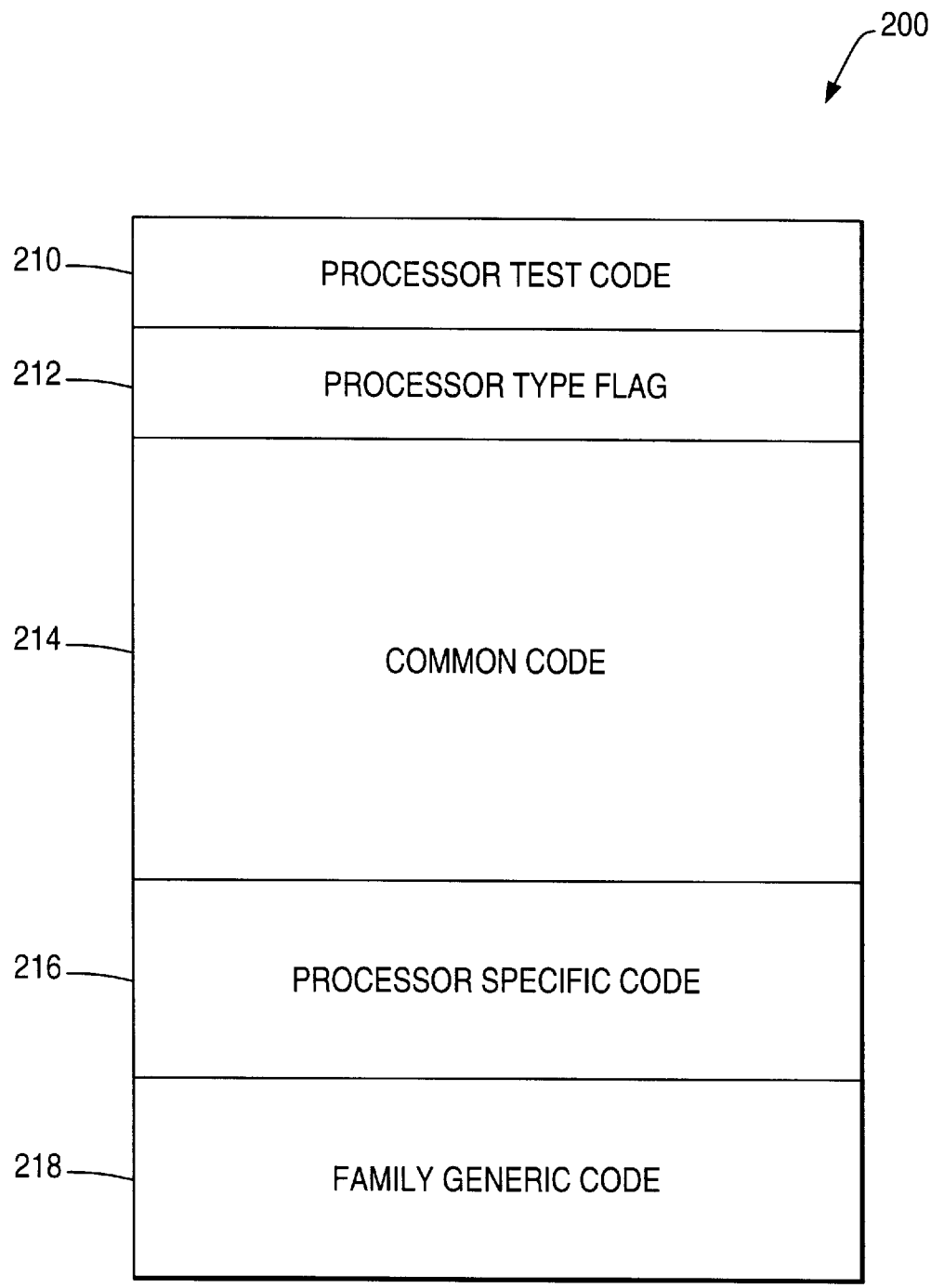
FIG. 2 is a block diagram of a first embodiment of a family generic processor specific (FGPS) file.

Referring to FIG. 2, there is shown a block diagram of one embodiment of a family generic/processor specific (FGPS) application 200. The FGPS file 200 includes a CPU test section 210, processor type flag 212, a common code section 214, a processor specific section 216, a family generic section 218.

The CPU test section 210 includes routines for determining which type of processor of a processor family is executing the FGPS file 200. Routines for determining processor type are well known in the art. Examples of routines for determining the processor type for processors of the i86 family may be found in the *Pentium Processor User's Manual*, volume 3: Architecture and Programming Manual, Intel Corporation 1993, the disclosure of which is hereby incorporated by reference. Furthermore, since the FGPS file 200 does not know the type of processor prior to executing the routines of the CPU test section 210, the CPU test section 210 must be entirely implemented with instructions common to the processor family.

The processor type flag 212 stores a processor type identifier which represents the type of processor that is executing the FGPS file 200. The processor type flag is a memory location that is part of the local memory space of the application. Furthermore, the processor type flag 212 must be implemented in such a way that all processors of the processor family may test the processor type flag because the processor type flag is tested in the common code section 214 which may be executed by any processor of the processor family.

The processor specific section 216 includes code that is optimized for a specific processor of a processor family. The code of the processor specific section 216 may include certain blocks, functions, routines, or any other sequence of instructions of the FGPS file 200 that may be optimized to take advantage of special features of the specific processor. Because the processor specific section 216 contains code that is optimized for a specific processor, the processor specific section 216 may contain instructions that are not supported by certain processors of the processor family or may contain instructions in an order that would obtain invalid results by certain processors of the processor family. Therefore, the FGPS file 200 also includes the family generic section 218 which provides code for performing the same functions as the processor specific section 216 but only utilizes instructions that are common amongst the processors of the processor family. In other words, between the processor specific section 216 and the family generic section 218, the FGPS file 200 includes at least two versions of code for certain tasks.

The common code section 214 in most cases is the largest part of the FGPS file 200, and therefore implements most of the functionality of the FGPS file 200. For example, if the FGPS file 200 is a spreadsheet application, most of the functionality of the spreadsheet application is implemented by instructions in this section. The common code section 214 implements this functionality by using only those instructions that are common to all members of a processor family. As a result of using only this common set of instructions, the common code section 214 may be executed by any member of the processor family.

The common code section 214 also contains code for implementing conditional structures. These conditional structures are used to conditionally divert execution of the FGPS file 200 depending upon the value of the processor type flag 212. For example, these conditional structures may cause the processor specific section 216 to be executed if the FGPS file 200 is running a certain processor of a processor family and may cause the family generic section 216 to be executed otherwise.

Figure 3:
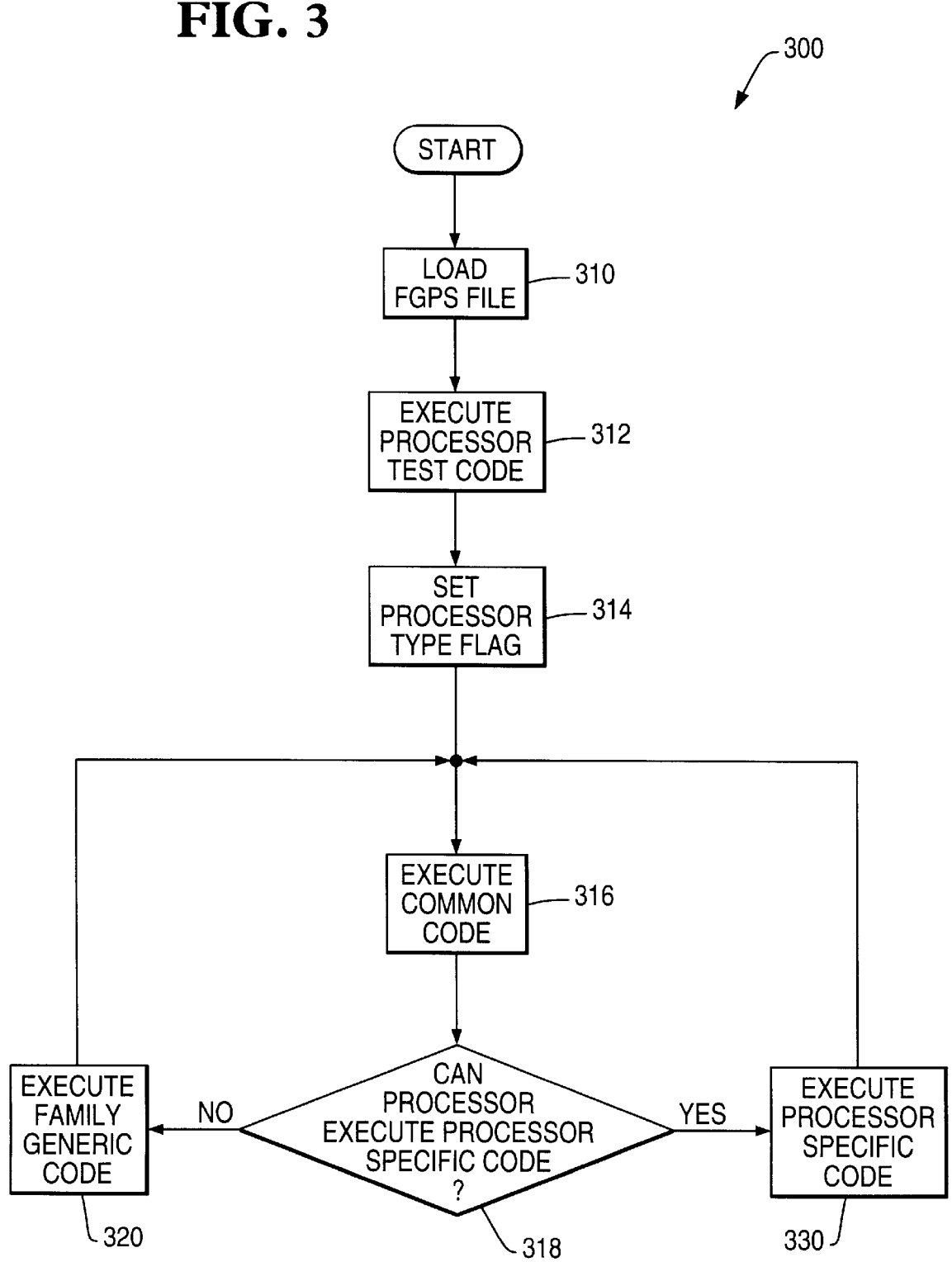
FIG. 3 is a flowchart illustrating the execution of the first embodiment of FGPS file.

FIG. 3 depicts a procedural flowchart 300 for executing the FGPS file 200 on the computer system 100 of FIG. 1. The procedural flowchart 300 will be discussed by way of two examples wherein the CPU test section 210, the common code section 214, and the family generic section 218 only utilize instructions common to the i86 processor family and wherein the processor specific section 216 is optimized for a Pentium processor. Furthermore in these two examples, the computer system 100 is controlled by an operating system program that is executing therein, and the first processor 102 of the computer system 100 is an Intel 486 processor and the second processor 104 is an Intel Pentium processor.

In the first example, the operating system program as a result of receiving a request to execute the FGPS file 200 transfers the FGPS file 200 from the mass storage device 108 to the main memory 106 and schedules the process of executing the FGPS file 200 to the first processor 102 (step 310). The first processor 102, then in step 312, executes the processor test section 210 which returns an identifier representing the processor type of the first processor 102. In step 314, the first processor 102 stores this identifier that represents the processor type of the first processor 102 in the processor type flag 212. In this example, since the first processor 102 is an Intel 486 processor, the processor test section 210 returns an identifier that represents an Intel 486 processor and causes this identifier to be stored in the processor type flag 212.

In step 316, the first processor 102 executes code from the common code section 214. The first processor 102 executes code from this common code section 214 until the first processor 102 comes to a point in the FGPS file 200 where a conditional structure directs the first processor 102 to execute either code from the family generic section 218 or the processor specific section 216 depending upon the processor type flag 212. Since in this first example, the processor type flag contains an identifier for a 486 processor and the processor specific section 216 is optimized for a Pentium processor, the first processor 102 determines in step 318 to continue to the family generic section 218. The first processor 102 then executes code in the family generic section 218 (step 320). After executing the appropriate code in family generic section 218, the first processor 102 returns back to the common code section 316. The first processor 102 continues executing code from the common code section 214 and the family generic section 218 until the FGPS file 200 is finished.

In the second example, the operating system program as a result of receiving a request to execute the FGPS file 200 transfers the FGPS file 200 from the mass storage device 108 to the main memory 106 and schedules the process of executing the FGPS file 200 to the second processor 104 (step 310). The second processor 104, then in step 312, executes the processor test section 210 which returns an identifier representing the processor type of the second processor 104. In step 314, the second processor 104 stores this identifier that represents the processor type of the second processor 104 in the processor type flag 212. In this second example, since the second processor 104 is an Intel Pentium processor, the processor test section 210 returns an identifier that represents an Intel Pentium processor and causes this identifier to be stored in the processor type flag 212.

In step 316, the second processor 104 executes code from the common code section 214. The second processor 104 executes code from this common code section 214 until the second processor 104 comes to a point in the FGPS file 200 where a conditional structure directs the second processor 104 to execute either code from the family generic section 218 or the processor specific section 216 depending upon the processor type flag 212. Since in this example, the processor type flag contains an identifier for a Pentium processor and the processor specific section 216 is optimized for a Pentium processor, the second processor 104 determines in step 318 to continue to the processor specific section 216. The second processor 104 then executes code in the processor specific section 216 (step 330). After executing the appropriate code in processor specific section 216, the second processor 104 returns back to the common code section 214. The second processor 104 continues executing code from the common code section 214 and the processor specific section 216 until the FGPS file 200 is finished.

Because the processor type of the executing processor in the above embodiment is only tested at the startup of the FGPS file 200, if the operating system supports multitasking, then the operating system may not start a FGPS file 200 on a processor of one type and later switch the execution of the FGPS file 200 to a processor of another type.

Figure 4:
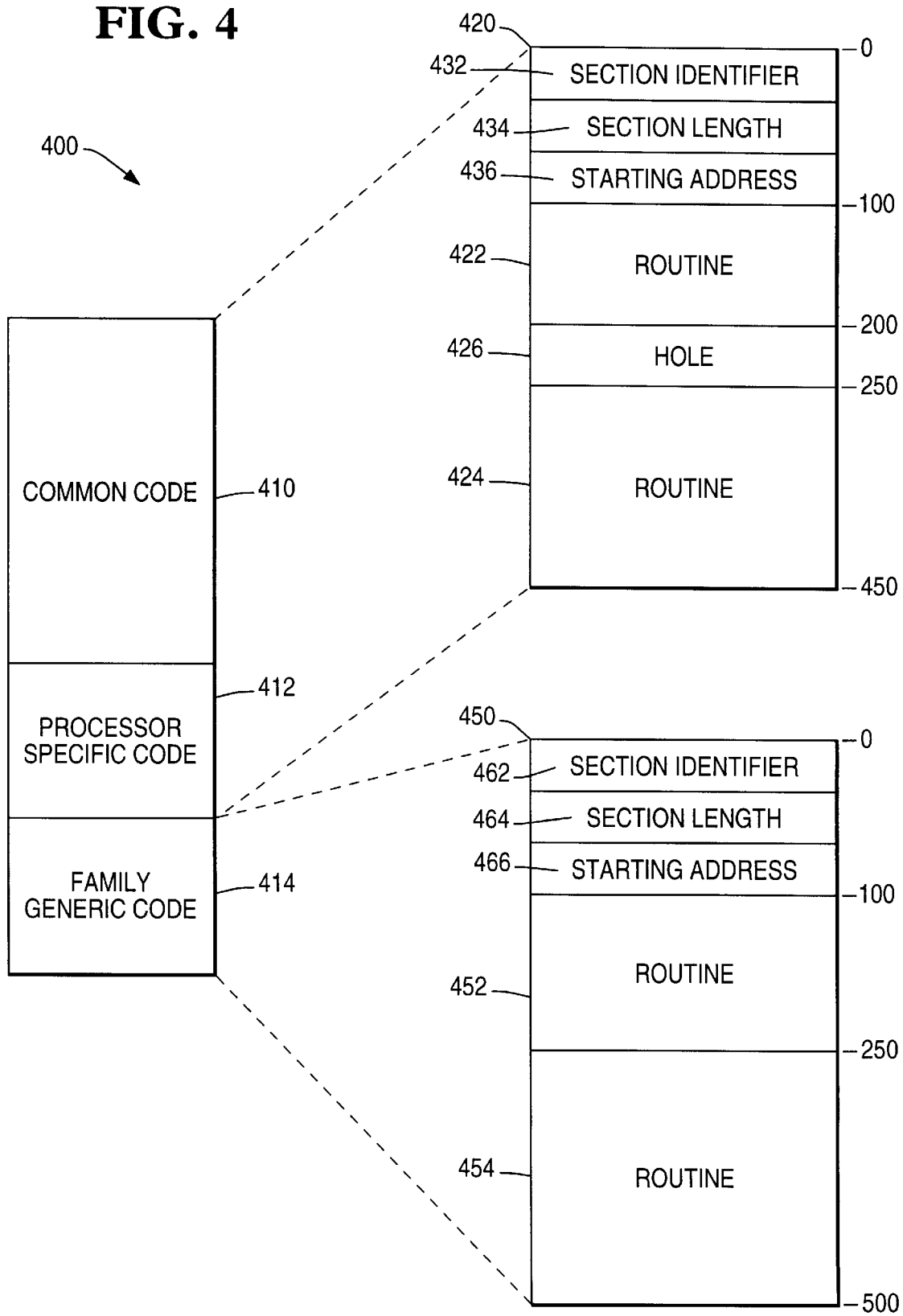
FIG. 4 is a block diagram of a second embodiment of a FGPS file.
Figure 5:
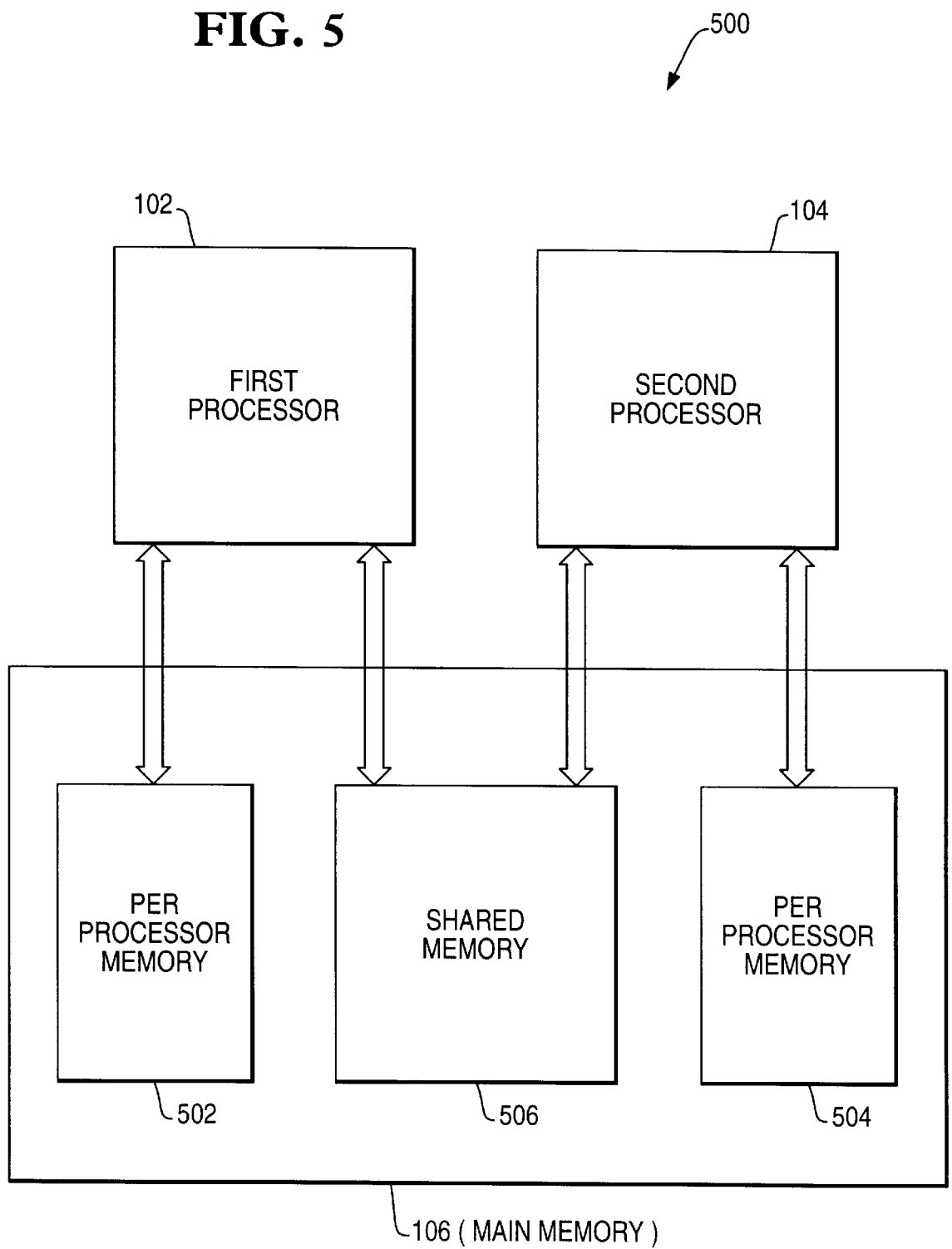
FIG. 5 block diagram illustrating a main memory organization suitable for the second embodiment of a FGPS file.

FIGS. 4–6 illustrate a method for executing a FGPS file that may be task switched from a processor of one type to a processor of another type. A FGPS file 400 suitable for this method is shown in FIG. 4. The FGPS file 400 includes a file header 408, common code section 410, processor specific section 412, a family generic section 414, and a section header table 416. The common code section 410, the processor specific section 412, and the family generic section 414 are aligned in FGPS file 400 in such a manner that each section maps to its own exclusive set of pages in main memory 106. In other words, FGPS file 400 contains at least three pages.

The file header 408 contains all the information required by the operating system to set up the process of executing the FGPS file 400. For example, the file header 408 may contain information such as a file type identifier (e.g. an identifier representing a FGPS file type), a pointer to the section header table 416, the address of the FGPS file 400 to begin execution, etc. Furthermore, the file header 408 in the preferred embodiment is at a fixed location in the FGPS file 400. By fixing the file header 408 of all FGPS files to a known location within the FGPS file 400, the operating system can easily obtain the file header information from the FGPS file 400 without scanning the whole FGPS file 400.

The common code section 410 in most cases is the largest part of the FGPS file 400, and therefore implements most of the functionality of the FGPS file 400. For example, if the FGPS file 400 is a spreadsheet application, most of the functionality of the spreadsheet application is implemented by instructions in this section. Furthermore, the common code section 410 utilizes only those instructions that are common to all members of a processor family. As a result of using only this common set of instructions, the common code section 410 may be executed by any processor of the processor family.

The processor specific section 412 includes at least one routine optimized for a specific processor (e.g. routines 422 and 424 in FIG. 4). Therefore, the processor specific section 412 may contain instructions that are not supported by certain processors of the processor family or may contain instructions ordered in such a manner as to cause certain processors of the processor family to obtain invalid results.

Since the processor specific section 412 may include routines that are not executable by some processors of the processor family, the FGPS file 400 also includes the family generic section 414 which contains routines that correspond to the routines of the processor specific section 412. However, the routines of the family generic section 414 only utilize instructions that are common amongst the processors of the processor family and are ordered in such a manner as to cause all processors of the processor family to obtain valid results.

Furthermore, routines of the processor specific section 412 and the family generic section 414 are aligned such that the corresponding routines of the processor specific section 412 and the family generic section 414 have the same offset. For example, in the example of FIG. 4, the processor specific section 412 contains a routine 422 at offset 100 and a routine 424 at offset 250, whereas the family generic section 414 contains a corresponding routine 452 at offset 100 and a corresponding routine 454 at offset 250. The routine 422 and the routine 452 are implemented to cause the computer system to perform the same function. Likewise, the routine 424 and the routine 454 cause the same function to be performed.

Since corresponding routines may be of different lengths, holes may result between routines of the processor specific section 412 and the family generic section 414. For example, routine 422 spans from offset 100 to offset 200 and the corresponding routine 452 spans from offset 100 to offset 250. Therefore, in order to keep routines 424 and 454 at the same offset (e.g. 250), the processor specific section contains a hole 426 between offset 200 to offset 250.

It should be appreciated that some compilers may be able to partially fill some of these holes at the cost of sequential execution of the routine. Furthermore, as will be better appreciated after the discussion of FIG. 6, corresponding routines of the processor specific section 412 and the family generic section 414 are assigned the same offset in order for the processor to execute the appropriate routine in response to references to these routines.

Finally, the section header table 416 includes information about each section of the FGPS file 400. For example, the section header table 416 may include information such as the section type, the virtual address of the section within the process, the offset of the section within the file, the section size, etc.

In FIG. 5, there is shown a block diagram of a suitable memory allocation scheme 500 for the hybrid multiprocessor computer system 100 of FIG. 1. In this memory allocation scheme 500, the operating system that is controlling the computer system 100 dynamically allocates at least one page of main memory 106 to each processor of the computer system 100. For example, the operating system may allocate first processor memory area 502 to the first processor 102, second processor memory area 504 to the second processor 104, and shared memory area 506 to both first processor 102 and second processor 104. In a preferred embodiment, the operating system may dynamically change the number pages of main memory 106 that are assigned to each of these areas of memory.

The first processor memory area 502 is only accessible by the operating system and processes executing on the first processor 102. Likewise, the second processor memory area 504 is only accessible by the operating system and processes executing on the second processor 104. However, the shared memory area 506 is accessible to the operating system and to processes executing on either the first processor 102 or the second processor 104.

Furthermore, in the preferred embodiment the operating system utilizes demand paging. In other words, the operating system transfers data from the mass storage device 108 to the main memory 106 only on demand. For example, when a file is first executed, the operating system brings in the first page of the file. Then, when one of the processors of the computer system 100 references a memory location of a second page of the file, a page fault is generated. In response to this page fault, operating system then transfers the second page of the file from the mass storage device 108 to the main memory 106.

In the preferred embodiment the operating system also utilizes virtual memory addressing. In other words, processes executing on the processors of the computer system 100 make references to main memory 106 via virtual addresses. The operating system takes these virtual addresses and converts them to physical addresses of main memory 106. As a result, the operating system may move pages within the main memory 106 without affecting the operation of the processes executing on the processors.

Referring now to FIG. 6, there is shown an exemplary procedural flowchart illustrating the execution of the FGPS file 400 on the computer system 100. In this example, the computer system 100 is controlled by an operating system having the features described above, the first processor 102 is an Intel 486 processor, the second processor 104 is an Intel Pentium processor, the processor specific code section 412 is optimized for a Pentium processor, and the common code section 410 and the family generic code section 414 are executable by any processor of the Intel i86 family. Furthermore, to simplify the discussion this example assumes that all virtual memory references are valid. In other words, the FGPS file 400 causes the first processor 102 and the second processor 104 to only address data and instructions of the process.

The operating system, preferably at the boot up time of the computer system 100, causes a processor test routine to be executed in order to determine the type of the first processor 102 (step 610). Then the operating system in step 612 causes a processor type identifier for the first processor 102 to be stored in a processor type flag of the first processor memory area 502. Since the first processor 102 is an Intel 486 processor, the operating system in step 612 causes a 486 processor identifier to be stored in the processor type flag of first processor memory area 502. The operating system then repeats steps 610 and 612 for the second processor 104. As a result, a Pentium processor identifier is stored in a processor type flag of second processor memory area 504 since the second processor 104 is a Pentium processor.

Then operating system in step 613 allocates a Memory Management Unit (MMU) table for each processor type configured in the computer system. The allocated MMU tables are used by the operating system to translate virtual addresses received from the processors to physical addresses. For example, in the computer system 100 the operating system would allocate a MMU table for the 486 processor type and a separate MMU table for the Pentium processor type and use the MMU table for the 486 processor type when translating virtual memory references of the first processor 102 to physical addresses. It should be appreciated that the MMU tables of different processor types may share a MMU sub-table that contains virtual address translations for the common code section 410.

In response to a request to execute the FGPS file 400, the operating system in step 614 reads the information stored in the file header 408 and the section header table 416 and generates in the shared memory area 506 a section table for the FGPS file 400. The section table contains information about the various sections of the FGPS file 400 so that in response to a page fault the operating system may resolve which section of the FGPS file 400 to load into main memory.

The operating system then causes the first page of the common code section 410 to be transferred from mass storage device 108 to the shared memory area 506, schedules the first processor 102 to execute the FGPS file 400, and updates the MMU table for 486 processor type (step 615).

In step 616, the first processor 102 executes this first page of the common code section 410 until the first processor 102 references a virtual address not within this first page of the common code section 410 thereby causing a page fault. In response to this page fault, the operating system must determine which page of the FGPS file 400 must be transferred from the mass storage device 108 to the main memory 106 in order to satisfy this virtual memory reference. The operating system first determines in step 618 whether the referenced virtual address is within the common code section 410 by examining the section table in the shared memory area 506. In this example, the operating system determines from the section table that this page fault is a result of referencing a virtual address within a second page of the common code section 410.

As a result of this determination, the operating system in step 620 causes this second page of the common code section 410 to be transferred from the mass storage device 108 to the shared memory area 506 and updates the MMU table for the 486 processor type. In step 616, the first processor 102 resumes execution of the FGPS file 400. The first processor 102 continues executing the FGPS file 400 in step 616 until the first processor 102 references a virtual address that is not within either the first page or the second page of the common code section 410 thereby generating a page fault. For example, the first processor 102 is assumed to have referenced the virtual address associated with either the routine 422 or the corresponding routine 452.

In response to this page fault, the operating system first determines in step 618 whether the referenced virtual address is within the common code section 410 by examining the section table in the shared memory area 506. The operating system determines from the section table that this page fault is not a result of referencing a virtual address within a page of the common code section 410 but is the result of referencing either the routine 422 or the corresponding routine 452.

The operating system in step 622 must determine whether the first processor 102 may execute the processor specific routine 422 by examining the processor type flag of the first processor memory area 502 and the section table of the shared memory 506. Since the section identifier 432 indicates that the processor specific code section 412 is optimized for a Pentium processor and that the processor flag of the first processor memory area 502 indicates that the first processor 102 is a 486 processor, the operating system determines in step 622 that the appropriate routine for the first processor 102 is routine 452.

As a result of this determination, the operating system causes the first page of the routine 452 to be transferred from the mass storage device 108 to the first processor memory area 502 (step 626) and updates the MMU table for the 486 processor type. In step 616, the first processor 102 resumes execution of the FGPS file 400. The first processor 102 continues executing the loaded pages of the FGPS file 400 in step 616 until the first processor 102 references a virtual address of a page that is not within either the first processor memory area 502 or the shared memory area 506.

This process of faulting in pages from either the common code section 410 or the family generic code section 414 continues until the execution of the FGPS file 400 is completed or the operating system switches the execution of the FGPS file 400 to the second processor 104.

To illustrate how this method of executing the FGPS file 400 supports task switching between processor types, it is assumed that the above two pages from the common code section 410 are stored in shared memory 506, the first page from the routine 452 is stored in first processor memory area 502, the operating system has stopped the execution of the FGPS file 400 in the common code section 410, and the operating system has scheduled the second processor 104 to resume the execution of the FGPS file 400.

It should be appreciated to enable task switching between different processor types, the operating system may only stop the execution in certain places in order to assure valid execution of the FGPS file 400 when it is resumed on a processor of a different type. For example, the simplest method to enable task switching between different processor types, is to have the operating system stop execution of the FGPS file 400 only when a processor is executing instructions in the common code section 410.

After the operating system has scheduled the execution of the FGPS file 400 for the second processor 104, the second processor 104 resumes the execution of the FGPS file 400 and continues executing the FGPS file 400 in step 616 until the second processor 104 references a virtual address that is not within either the first page or the second page of the common code section 410 thereby generating a page fault. For illustration, the second processor 104 is assumed to have referenced the virtual address associated with either the routine 422 or the corresponding routine 452. A reference by the second processor 104 to the virtual address associated with routines 422 and 452 will generate a page fault even though the first page of the routine 452 is stored in the first processor memory area 502. This is because the MMU table for the Pentium processor type does not yet contain an entry for virtual address associated with routines 422 and 452, and as a result, from the view point of the second processor 104 the main memory 106 does not contain the first page for either routine 422 or routine 452.

In response to this page fault, the operating system first determines in step 618 whether the referenced virtual address is within the common code section 410 by examining the stored header information in the shared memory area 506. The operating system determines from this stored header information that this page fault is not a result of referencing a virtual address within a page of the common code section 410 but is the result of referencing either the routine 422 or the corresponding routine 452.

The operating system in step 622 must then determine whether the second processor 104 may execute the processor specific routine 422 by examining the processor type flag of the second processor memory area 504 and the stored header information of the shared memory 506. Since the section identifier 432 indicates that the processor specific code section 412 is optimized for a Pentium processor and that the processor flag of the second processor memory area 504 indicates that the second processor 104 is a Pentium processor, the operating system determines in step 622 that the appropriate routine for the second processor 104 is routine 422.

As a result of this determination, the operating system causes the first page of the routine 422 to be transferred from the mass storage device 108 to the second processor memory area 504 (step 626) and updates the MMU table for the Pentium processor type. In step 616, the second processor 104 resumes execution of the FGPS file 400. The second processor 104 continues executing the loaded pages of the FGPS file 400 in step 616 until the second processor 104 references a virtual address of a page that is not within either the second processor memory area 504 or the shared memory area 506. This process of faulting in pages from either the common code section 410 or the processor specific code section 412 continues until the execution of the FGPS file 400 is completed or the operating system switches the execution of the FGPS file 400 back to the first processor 102.

It should be appreciated that in the above two described embodiments that the common code section and family generic section may be implemented for execution on a smaller subset of processors than the whole processor family. For example, the common code section may be implement to support all i86 processors later than a 386 processor.

Furthermore, it should be appreciated that the FGPS files may contain more than one processor specific code section. For example, the FGPS file may include a processor specific code section optimized for a Pentium and another processor specific code section optimized for a Pentium Pro.

It should further be appreciated that the processor specific codes section of the FGPS files may be optimized for more than one processor type. For example, the processor specific code section may be optimized for a Pentium and a Pentium Pro and the common code section and the family generic section support the remaining processors of the i86 family.

While the invention has been illustrated and described in detail in the drawings and foregoing description, such illustration and description is to be considered as exemplary and not restrictive in character, it being understood that only two preferred embodiments have been shown and described and that all changes and modifications that come within the spirit of the invention are desired to be protected.

What is claimed is:

1. A method of executing a file on a computer system, comprising the computer implemented steps of:

determining the processor type of a processor;

storing a processor type identifier that represents the determined processor type of the processor;

executing a first plurality of instructions that includes instructions exclusively from a common set of instructions that are common to a plurality of processor types;

executing a second plurality of instructions that is optimized for a first processor type, if the processor type identifier indicates that the processor is of the first processor type; and executing a third plurality of instructions that includes instructions exclusively from the common set of instructions, if the processor type identifier indicates the processor is of a type different than the first processor type.

2. The method of claim 1, wherein the step of determining the processor type includes the computer implemented step of:

executing a processor test routine of the file during the execution of the file.

3. The method of claim 2, wherein the processor test routine includes instructions exclusively from the common set of instructions.

4. The method of claim 1, wherein the second plurality of instructions and the third plurality of instructions cause the computer system to perform the same task.

5. The method of claim 1, wherein the step of storing the processor type identifier includes the computer implemented step of:

storing the processor type identifier in a processor type flag within the file.

6. The method of claim 1, wherein the step of storing the processor type identifier includes the computer implemented step of:

storing the processor type identifier in a processor memory area that is allocated to the first processor.

7. The method of claim 1, further including the computer implemented step of:

executing the second plurality of instructions if the processor type identifier indicates that the processor is of a second processor type, wherein the second plurality of instructions is also optimized for the second processor type.

8. A method of executing a file on a computer system, comprising the computer implemented steps of:

determining the processor type of a first processor;

storing a first processor type identifier that represents the determined processor type of the first processor;

allocating execution of the file to the first processor;

loading a first page of instructions from a common code section of the file into a shared memory area;

executing the first page of instructions until a reference to a second page of the file is made;

determining which page of the file to load in order to satisfy the reference;

loading the determined second page of instructions to the shared memory area if the second page is from the common code section of the file;

loading the determined second page of instructions to the shared memory area if the second page is from the family generic section of the file; and loading the determined second page of instructions to a first processor memory area if the second page is from the processor specific section of the file, wherein the common code section includes a plurality of pages consisting of instructions from a common set of instructions that is common to the processor type of the first processor and second processor type, wherein the processor specific section includes a plurality of pages that have been optimized for a certain processor type, and wherein the family generic section includes a plurality of pages consisting of instructions from a common set of instructions that is common to the processor type of the first processor and a second processor type.

9. The method of claim 8, further including the computer implemented steps of:

storing processor specific header data from a processor specific header of the file to the shared memory area; and storing family generic header data from a family generic header of the file to the shared memory area, wherein the step of determining which page of the file to load includes the computer implemented step of examining the processor specific header data, the family generic header data, and the first processor identifier.

10. The method of claim 8, further including the computer implemented steps of:

determining the processor type of a second processor; and storing a second processor type identifier that represents the determined processor type of the second processor.

11. The method of claim 10, wherein:

the step of determining the processor type of the first processor occurs at the boot up time of the computer system;

the step of determining the processor type of the second processor occurs at the boot up time of the computer system;

the step of storing the first processor type identifier includes the computer implemented step of storing the first processor type identifier in the first processor memory area; and the step of storing the second processor type identifier includes the computer implemented step of storing the second processor type identifier in a second processor memory area.

12. The method of claim 11, further including the step of:

reallocating the execution of the file to the second processor.

13. The method of claim 12, wherein the step of reallocating the execution of the file includes the steps of:

stopping the execution of the file while a page from the common code section is being executed by the first processor; and scheduling the second processor to resume execution of the file at the point where execution was stopped.

14. A computer system comprising:

a first processor of a first processor type;

a second processor of a second processor type;

a computer readable medium having stored thereon a file comprising a common code section, a processor specific section, and a family generic section, wherein said common code section includes a plurality of pages consisting of instructions from a common set of instructions that is common to said first processor type and said second processor type, said processor specific section includes a plurality of pages that have been optimized for said first processor type, and said family generic section includes a plurality of pages consisting of instructions from said common set of instructions; and a memory coupled to said first processor, said second processor, and said computer readable medium; said memory including a first processor memory area, a second processor memory area, and a shared memory area, said memory having stored therein sequences of instructions which, when executed by said first processor and said second processor, cause said first processor and said second processor to perform the steps of:

determining said processor type of said first processor;

storing a first processor type identifier that represents said determined processor type of said first processor in said first processor memory;

allocating execution of said file to said first processor;

loading a first page of instructions from said common code section of said file into said shared memory area;

executing said first page of instructions until a reference to a second page of said file is made;

determining which page of said file to load in order to satisfy said reference;

loading said determined second page of instructions to said shared memory area if said second page is from said common code section of said file;

loading said determined second page of instructions to said shared memory area if said second page is from said family generic section of said file; and loading said determined second page of instructions to a first processor memory area if said second page is from said processor specific section of said file.

15. The computer system of claim 14, wherein said memory further includes a sequence of instructions which, when executed by said first processor and said second processor, cause said first processor and said second processor to perform the steps of:

storing processor specific header data from a processor specific header of said file to said shared memory area; and storing family generic header data from a family generic header of said file to said shared memory area, wherein the step of determining which page of said file to load includes the step of examining said processor specific header data, said family generic header data, and said first processor identifier.

16. The computer system of claim 14, wherein said memory further includes a sequence of instructions which, when executed by said first processor and said second processor, cause said first processor and said second processor to perform the steps of:

determining said processor type of a second processor; and storing a second processor type identifier that represents said determined processor type of said second processor.

17. The computer system of claim 16, wherein:

the step of determining said processor type of said first processor occurs at boot up time;

the step of determining said processor type of said second processor occurs at boot up time;

the step of storing said first processor type identifier includes the step of storing said first processor type identifier in said first processor memory area; and the step of storing said second processor type identifier includes the step of storing said second processor type identifier in a second processor memory area.

18. The computer system of claim 17, wherein said memory further includes a sequence of instructions which, when executed by said first processor and said second processor, cause said first processor and said second processor to perform the steps of:

reallocating said execution of said file to said second processor.

19. The computer system of claim 18, wherein the step of reallocating said execution of said file includes the steps of:

stopping said execution of said file while a page from said common code section is being executed by said first processor; and scheduling said second processor to resume execution of said file at a point where execution was stopped.

* * * * *